Patented Nov. 2, 1937

2,098,039

UNITED STATES PATENT OFFICE 2,098,039

PREPARATION OF SECONDARY AROMATIC AMINES

Alfred G. Hill, Bound Brook, N. J., and Arthur J. Hill, New Haven, Conn., assignors to The Calco Chemical Company, Inc., Bound Brook, N. J., a corporation of Delaware No Drawing. Application December 6, 1935, Serial No. 53,208

20 Claims. (Cl. 260—128)

This invention relates to the synthesis of secondary aromatic and heterocyclic amines by passing vapors of primary aromatic or heterocyclic amines over suitable catalysts with the splitting off of ammonia. More particularly, the invention relates to the catalytic synthesis of diphenylamine from aniline.

In the past, diphenylamine has been produced by heating aniline with aniline salts in the liquid phase, usually under pressure, with or without catalysts. This process is expensive and usually requires pressure equipment and uses a more expensive raw material. It has also been proposed to produce diphenylamine from aniline by vapor phase catalysis at temperatures below 400° C. using a base exchange catalyst. This process gives yields too small to be commercially attractive.

According to the present invention a nonbaseexchanging catalyst containing as its major component aluminum oxide or titanium oxide when used at temperatures preferably above 400° C. gives very much better yields. Apparently the other elements which are present in a base exchange catalyst appear to adverse the effect of the conversion as even at temperatures below 400° C. the nonbaseexchanging catalysts of the present invention give better results than do the base exchange catalysts. Nonbaseexchanging catalysts containing major amounts of aluminum oxide, such as various forms of aluminum oxide, natural or synthetic, kaolin and the like, give better yields than do the catalysts which contain titanium oxide as their major component but the latter still gives yields which are high enough to be practically useful.

In the present invention the vapors of the primary amine are passed over the catalyst at a temperature far above the boiling point of the amine and preferably above 400° C. The unreacted primary amine is easily separated from the ammonia and secondary amine formed and reused, the process being therefore a cyclic one if desired. The preferred temperatures will vary to some extent with the amine. In general, they are over 400° C. and for aniline the preferred temperature is about 450° C. The rate at which the amine is passed over the catalyst depends on the catalyst and on the economics of the situation. A great throughput per unit volume of catalyst will result in a higher output, but if pushed too far this higher output is at the expense of conversion efficiency. The best rate will vary with the amine and with the particular catalyst. In general, with the common amines, a rate of from 5 to 10 pounds of amine per cubic foot of catalyst per hour gives favorable results.

The reaction can be carried out either at atmospheric pressure or under somewhat elevated pressure. Inasmuch as an increase in pressure does not result in great increases in yield, it is usually preferable to operate at atmospheric pressure although in its broader aspects the invention is not limited to the use of any particular pressure.

As the reaction proceeds impurities gather on the catalyst and gradually reduce its efficiency. When the activity of the catalyst has dropped below the economic point, it may be reactivated by burning out the impurities which can be effectively achieved by blowing hot air through the converter since the catalyst is also an effective combustion catalyst.

Various types of aluminum oxide compounds may be employed, thus bauxite is useful and as are various prepared aluminum oxides particularly highly porous aluminum oxides such as alumina gel which is prepared by reacting amalgamated aluminum on water. Certain aluminum silicates such as kaolin also give good results. The aluminum oxide may be employed alone or may be mounted on a carrier such as asbestos or pumice. Good results are also obtained by the addition of small amounts of readily reducible oxides to the aluminum oxide, thus, for example, copper oxide in small amounts is effective as a promoter of the initial activity of the catalyst. Titanium oxides can also be used and while they are slightly less effective than aluminum oxide, they are, nevertheless, efficient, practical catalysts.

The present invention presents distinct advantages over the former standard practice in the production of diphenylamines by the reaction of aniline and aniline hydrochloride in an autoclave. It is a continuous process and avoids expensive pressure apparatus. There are no corrosion difficulties due to hydrochloric acid liberated which permits of constructing the plant of ordinary materials and, finally, a product of higher purity is obtained.

The invention will be described in greater detail in the following specific examples which are typical illustrations of various modifications of the invention but are not intended to limit its scope.

*Example 1*

Aniline is passed over aluminum oxide, bauxite, contained in a catalytic chamber, at a rate of about six pounds of amine per hour per cubic foot of catalyst. The temperature of the catalyst is maintained at about 450° C. The reaction product consists essentially of a mixture of diphenylamine, aniline and ammonia. The diphenylamine is produced at approximately the rate of one pound per hour. The ammonia formed is about one-tenth of the weight of the diphenylamine produced. The products are separated by fractional distillation and the aniline is recirculated in the process. After the reaction has proceeded for some time, the efficiency of the catalyst falls off and must be regenerated by removing the contaminating materials. This is effectively accomplished by passing air through the hot catalytic mass until its normal efficiency is restored.

*Example 2*

Aniline is passed over titanium oxide, contained in a catalytic chamber, at a rate of about six pounds of amine per hour per cubic foot of catalyst. The temperature of the catalyst is maintained at 450° C. The reaction product consists essentially of a mixture of diphenylamine, aniline and ammonia. The diphenylamine is produced at approximately the rate of ½ pound per hour. The ammonia formed is about one-tenth of the weight of the diphenylamine produced. The products are separated by fractional distillation and the aniline is recirculated in the process. After the reaction has proceeded for some time, the efficiency of the catalyst falls off and must be regenerated by removing the contaminating materials. This is effectively accomplished by passing air through the hot catalytic mass until its normal efficiency is restored.

*Example 3*

Paratoluidine is passed over a prepared aluminum oxide catalyst. The temperature of the catalyst is maintained at about 440° C. The reaction product consists chiefly of a mixture of ditolylamine, paratoluidine and ammonia. The products of the reaction are separated by fractional distillation and the paratoluidine is recirculated in the process. The catalyst is reactivated when the efficiency falls off as in the previous examples.

*Example 4*

Betanaphthylamine is passed over bauxite. The catalyst is maintained at a temperature of about 375° C. The reaction product consists essentially of dinaphthylamine, betanaphthylamine and ammonia. The components of the reaction product are separated by fractional distillation and the unchanged betanaphthylamine is recirculated in the process. The catalyst is regenerated when necessary, as previously described.

*Example 5*

2-aminopyridine is passed over bauxite, contained in a catalytic chamber, at a rate of about thirty pounds of amine per hour per cubic foot of catalyst. The temperature of the catalyst is maintained at about 450° C. The reaction product consists essentially of a mixture of 2,2'-dipyridylamine, 2-aminopyridine, and ammonia. The products are separated by fractional distillation and the aminopyridine is recirculated in the process. After the reaction has proceeded for some time, the efficiency of the catalyst falls off and must be regenerated by removing the contaminating materials. This is effectively accomplished by passing air through the hot catalytic mass until its normal efficiency is restored.

We claim:

1. A method of producing secondary amines included in the group consisting of aromatic amines and heterocyclic amines containing a secondary amino group outside of the heterocyclic ring which comprises vaporizing the corresponding primary amine in the absence of the corresponding phenol and passing the vapors over a catalyst containing a major proportion of an oxide of a metal included in the group consisting of aluminum and titanium, at a temperature above 400° C.

2. A method of producing secondary amines included in the group consisting of aromatic amines and heterocyclic amines containing a secondary amino group outside of the heterocyclic ring which comprises vaporizing the corresponding primary amine in the absence of the corresponding phenol and passing the vapors at reaction temperature over a nonbaseexchanging catalyst containing as its major component an oxide of a metal included in the group consisting of aluminum and titanium.

3. A method of producing secondary aromatic amines which comprises vaporizing the corresponding primary aromatic amine in the absence of the corresponding phenol and passing the vapors over a catalyst containing a major proportion of an oxide of a metal included in the group consisting of aluminum and titanium, at a temperature above 400° C.

4. A method of producing secondary aryl amines which comprises vaporizing the corresponding primary amine in the absence of the corresponding phenol and passing the vapors over a catalyst containing a major component of aluminum oxide at temperatures above 400° C.

5. A method of producing secondary aromatic amines which comprises vaporizing the corresponding primary amine in the absence of the corresponding phenol and passing the vapors at reaction temperature over a nonbaseexchanging catalyst containing as its major component an oxide of a metal included in the group consisting of aluminum and titanium.

6. A method of producing secondary aryl amines which comprises vaporizing the corresponding primary amine in the absence of the corresponding phenol and passing the vapors at reaction temperatures over a nonbaseexchanging catalyst containing a major proportion of aluminum oxide.

7. A method of producing secondary aromatic amines which comprises vaporizing the corresponding primary amine in the absence of the corresponding phenol, passing the vapors at reaction temperature over a catalyst containing a major portion of an oxide of a metal included in the group consisting of aluminum and titanium until the catalyst efficiency diminishes below the point of economic production, regenerating the catalyst by passing hot air thereover at a temperature sufficiently high to burn out organic impurities and reusing the reactivated catalyst.

8. A method of producing secondary aromatic amines which comprises vaporizing the corresponding primary amine in the absence of the corresponding phenol, passing the vapors at reaction temperature over a catalyst containing a major portion of aluminum oxide until the catalyst efficiency diminishes below the point of economic production, regenerating the catalyst by passing hot air thereover at a temperature sufficiently high to burn out organic impurities and reusing the reactivated catalyst.

9. A method of producing secondary aromatic amines which comprises vaporizing the corresponding primary amine in the absence of the corresponding phenol, passing the vapors at temperatures above 400° C. over a catalyst containing a major portion of an oxide of a metal included in the group consisting of aluminum and titanium until the catalyst efficiency diminishes below the point of economic production, regenerating the catalyst by passing hot air thereover at a temperature sufficiently high to burn out organic impurities and reusing the reactivated catalyst.

10. A method of producing secondary aromatic amines which comprises vaporizing the corresponding primary amine in the absence of the corresponding phenol, passing the vapors at temperatures above 400° C. over a catalyst containing a major portion of aluminum oxide until the catalyst efficiency diminishes below the point of economic production, regenerating the catalyst by passing hot air thereover at a temperature sufficiently high to burn out organic impurities and reducing the reactivated catalyst.

11. A method of producing secondary aromatic amines which comprises vaporizing the corresponding primary amine in the absence of the corresponding phenol, passing the vapors at reaction temperature over a nonbaseexchanging catalyst containing a major portion of an oxide of a metal included in the group consisting of aluminum and titanium until the catalyst efficiency diminishes below the point of economic production, regenerating the catalyst by passing hot air thereover at a temperature sufficiently high to burn out organic impurities and reusing the reactivated catalyst.

12. A method of producing secondary aromatic amines which comprises vaporizing the corresponding primary amine in the absence of the corresponding phenol, passing the vapors at reaction temperature over a nonbaseexchanging catalyst containing a major portion of aluminum oxide until the catalyst efficiency diminishes below the point of economic production, regenerating the catalyst by passing hot air thereover at a temperature sufficiently high to burn out organic impurities and reusing the reactivated catalyst.

13. A method according to claim 3 in which the secondary amine is diphenylamine and the primary amine is aniline.

14. A method according to claim 4 in which the secondary amine is diphenylamine.

15. A method according to claim 5 in which the secondary amine is diphenylamine and the primary amine is aniline.

16. A method according to claim 6 in which the secondary amine is diphenylamine and the primary amine is aniline.

17. A method according to claim 3 in which the secondary amine is ditolylamine and the primary amine is toluidine.

18. A method according to claim 4 in which the secondary amine is ditolylamine and the primary amine is toluidine.

19. A method according to claim 3 in which the secondary amine is a dinaphthylamine and the primary amine is a naphthylamine.

20. A method according to claim 4 in which the secondary amine is a dinaphthylamine and the primary amine is a naphthylamine.

ALFRED G. HILL.
ARTHUR J. HILL.